United States Patent
Li et al.

(10) Patent No.: US 9,487,886 B1
(45) Date of Patent: Nov. 8, 2016

(54) INDIUM TIN OXIDE NANOTUBES AND METHOD OF MANUFACTURE

(75) Inventors: Wen Li, El Segundo, CA (US); Chaoyin Zhou, Chino Hills, CA (US); Richard W. Burns, Edwardsville, IL (US); Robert E. Doty, Los Angeles, CA (US); Amanda Phelps, Malibu, CA (US)

(73) Assignee: THE BOEING COMPANY, Chicago, IL (US)

( * ) Notice: Subject to any disclaimer, the term of this patent is extended or adjusted under 35 U.S.C. 154(b) by 689 days.

(21) Appl. No.: 12/787,970

(22) Filed: May 26, 2010

(51) Int. Cl.
*D02G 3/00* (2006.01)
*D01F 9/08* (2006.01)

(52) U.S. Cl.
CPC ..................................... *D01F 9/08* (2013.01)

(58) Field of Classification Search
CPC ........... D01F 9/08; D01D 5/24; D01D 10/00
USPC ....................................................... 428/398
See application file for complete search history.

(56) References Cited

U.S. PATENT DOCUMENTS

| | | | |
|---|---|---|---|
| 7,592,415 | B2 | 9/2009 | Hovanec et al. |
| 8,088,323 | B2 | 1/2012 | Hellring et al. |
| 8,211,353 | B2 | 7/2012 | Dee et al. |
| 2007/0116640 | A1 | 5/2007 | Kim et al. |
| 2008/0146698 | A1 | 6/2008 | Hovanec et al. |
| 2008/0207798 | A1 | 8/2008 | Hellring et al. |
| 2009/0114883 | A1* | 5/2009 | Collier et al. ............... 252/503 |
| 2010/0112373 | A1 | 5/2010 | Coffey et al. |

FOREIGN PATENT DOCUMENTS

WO      WO 2010052704 A2 *   5/2010

OTHER PUBLICATIONS

Zhang et al., Fabrication and Characterization of Indium Tin Oxide—Carbon Nanotube Nanocomposites, 2009, J. Phys. Chem., 113, 15538-15543.*
Lee, Y-I. et al., "Synthesis and Electrical Property of Indium Tin Oxide Nanofibers Using Electrospinning Method," *Journal of Nanoscience and Nanotechnology*, vol. 7, pp. 3910-3913 (2007).
Wan, Q. et al., "Vertically aligned tin-doped indium oxide nanowire arrays: Epitaxial growth and electron field emission properties," *Applied Physics Letters*, 89, pp. 123102-1 through 123102-3 (2006).
Wan, Q. et al., "Epitaxial Growth of Vertically Aligned and Branched Single-Crystalline Tin-Doped Indium Oxide Nanowire Arrays," *Advanced Materials*, 18, pp. 234-238 (2006).
Munir, M.M. et al., "Optical and electrical properties of indium tin oxide nanofibers prepared by electrospinning," *Nanotechnology*, 19, 145603 (6 pages) (2008).
Lin, D. et al., "Preparation and electrical properties of electrospun tin-doped indium oxide nanowires," *Nanotechnology*, 18, 465301, 6 pages (2007).
Yu, D. et al., "Synthesis of ITO Nanowires and nanorods with corundum structure by a co-precipitation-anneal method," *Materials Letters*, 58, pp. 84-87 (2003).
Nguyen, P. et al., "Epitaxial Directional Growth of Indium-Doped tin Oxide Nanowire Arrays," *Nano Letters*, vol. 3, No. 7, pp. 925-928 (2003).

(Continued)

*Primary Examiner* — Peter Y Choi
*Assistant Examiner* — Vincent A Tatesure
(74) *Attorney, Agent, or Firm* — Thompson Hine LLP

(57) ABSTRACT

A nanowire structure that includes indium tin oxide and has a hollow core.

19 Claims, 5 Drawing Sheets

(56) References Cited

OTHER PUBLICATIONS

Wan, Q. et al., "High-Performance Transparent Conducting Oxide Nanowires," *Nano Letters*, vol. 6, No. 12, pp. 2909-2915 (2006).
Xia, Y. et al., "One-Dimensional Nanostructures: Synthesis, Characterization, and Applications," *Advanced Materials*, 15, No. 5, pp. 353-389 (Mar. 4, 2003).
McCann, J.T. et al., "Electrospinning of nanofibers with core-sheath, hollow, or porous structures," *Journal of Materials Chemistry*, 15, p. 735-738 (2005).
Kim, P. et al., "Thermal Transport Measurement of Individual Multiwalled Nanotubes," *Physical Review Letters*, vol. 87, No. 21, pp. 215502-1 through 215502-4 (Nov. 19, 2001).
Small, J.P. et al., "Mesoscopic thermal and thermoelectric measurements of individual carbon nanotubes," *Solid State Communications*, 127, pp. 181-186 (2003).
Wang, H-W. et al., "Three-dimensional electrodes for dye-sensitized solar cells: synthesis of indium-tin-oxide nanowire arrays and ITO/$TiO_2$ core-shell nanowire arrays by electrophoretic deposition," *Nanotechnology*, 20, 055601, 9 pages (2009).
Treacy, M.M.J. et al., "Exceptionally high Young's modulus observed for individual carbon nanotubes," *Nature*, vol. 381, p. 678-680 (Jun. 20, 1996).
Wan, Q. et al., "Single-crystalline tin-doped indium oxide whiskers: Synthesis and characterization," *Applied Physics Letters*, vol. 85, No. 20, pp. 4759-4761 (Nov. 15, 2004).
Xue, X.Y. et al., "Synthesis and ethanol sensing properties of indium-doped tin oxide nanowires," *Applied Physics Letters*, 88, 201907, 3 pages (2006).
Wang, Y. et al., "Synthesis of ultra-fine porous tin oxide fibres and its process characterization," *Nanotechnology*, 18, 295601, 7 pages (2007).
Li, D. et al., "Electrospinning of Nanofibers: Reinventing the Wheel?" *Advanced Materials*, 16, No. 14, pp. 1151-1170 (2004).
Kim, H. et al., "Highly oriented indium tin oxide films for high efficiency organic light-emitting diodes," *Journal of Applied Physics*, vol. 91, No. 8, pp. 5371-5376 (Apr. 15, 2002).
Ohta, H. et al., "Highly electrically conductive indium-tin-oxide thin films epitaxially grown on yttria-stabilized zirconia (100) by pulsed-laser deposition," *Applied Physics Letters*, vol. 76, No. 19, pp. 2740-2742 (May 8, 2000).
Tahar, R.B.H. et al., "Electronic transport in tin-doped indium oxide thin films prepared by sol-gel technique," *Journal of Applied Physics*, vol. 83, No. 4, pp. 2139-2141 (Feb. 15, 1998).
Takada, T. et al., "Aqueous ozone detector using $In_2O_3$ thin-film semiconductor gas sensor," *Sensors and Actuators*, B 24-25, pp. 548-551 (1995).
Kamei, M. et al., "Heteroepitaxial growth of tin-doped indium oxide films on single crystalline yttria stabilized zirconia substrates," *Appl. Phys. Lett.*, 64 (20), pp. 2712-2714 (May 16, 1994).
Teo, W.E. et al., "A review of electrospinning design and nanofibre assemblies,"*Nanotechnology*, 17, pp. R89-R106 (2006).
Unpublished U.S. Appl. No. 12/787,774, filed May 26, 2010.
Xu, Shiyou et al., "Low temperature high sensor response nano gas sensor using ITO nanofibers," *Sensors and Actuators B: Chemical*, 143, pp. 71-75 (2009).
Office Action, U.S. Appl. No. 12/787,774, Aug. 16, 2012.
Office Action, U.S. Appl. No. 12/787,774, Jan. 11, 2013.

\* cited by examiner

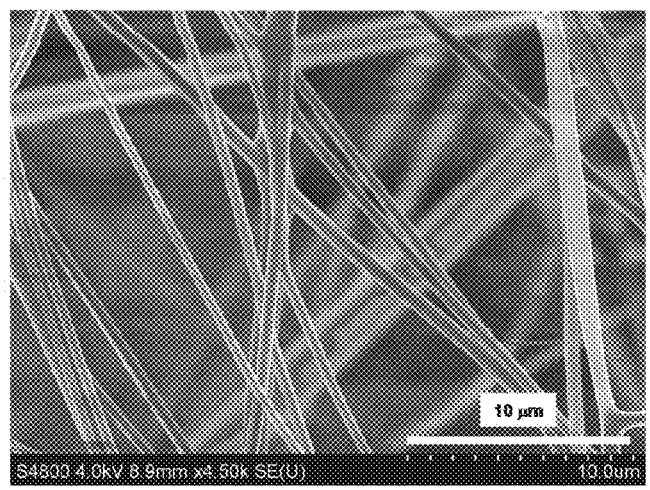
FIG. 3
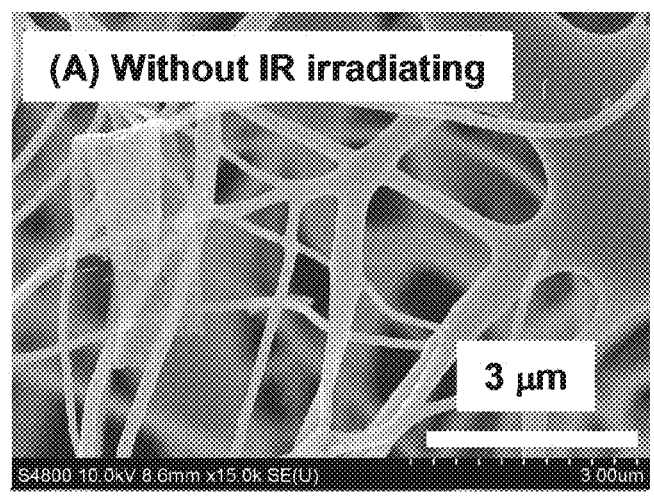
FIG. 4A(1)
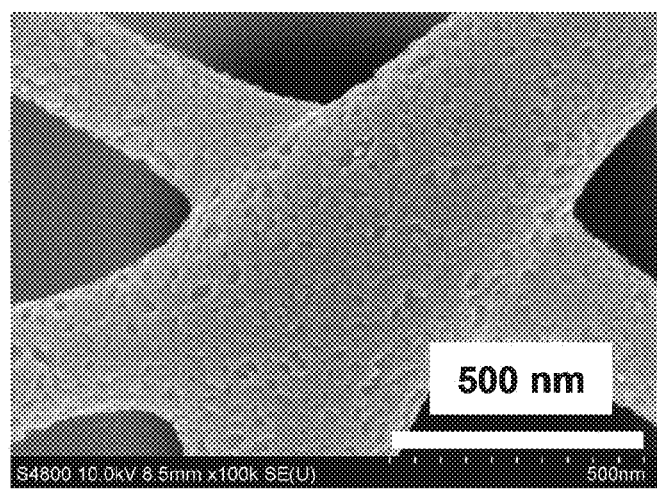
FIG. 4A(2)

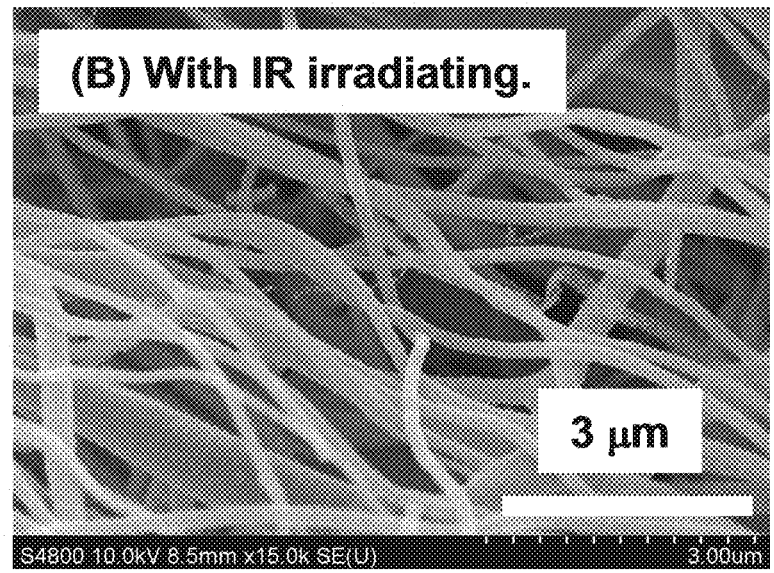
FIG. 4B(1)
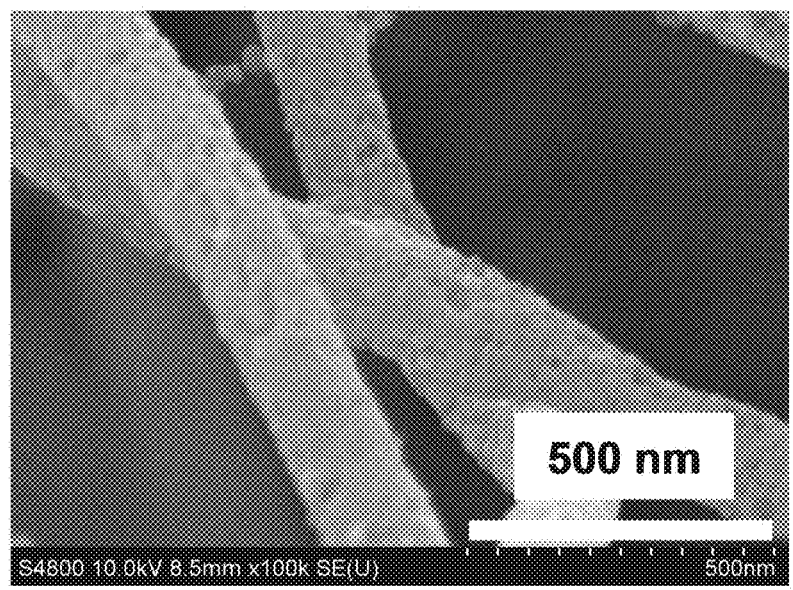
FIG. 4B(2)

INDIUM TIN OXIDE NANOTUBES AND METHOD OF MANUFACTURE

CROSS-REFERENCE TO RELATED APPLICATION

This application is related to U.S. Ser. No. 12/787,774 filed on May 26, 2010, the entire contents of which are incorporated herein by reference.

FIELD

This application relates to indium tin oxide and, more particularly, to indium tin oxide nanotubes and methods for manufacturing the same.

BACKGROUND

Indium tin oxide, also known as tin-doped indium oxide or ITO, is used in a variety of applications due to its electrical conductivity and optical transparency. For example, indium tin oxide has been used as an electrically conductive coating material in photovoltaic cells, smart windows, organic light-emitting diodes and flat-panel displays.

It has recently been discovered that the applications of indium tin oxide can be enhanced by using nanostructures of indium tin oxide, and indium tin oxide nanostructures, including nanowires, have been prepared. However, the indium tin oxide nanowires reported in the literature have been solid.

Accordingly, those skilled in the art continue to seek new forms and applications of indium tin oxide.

SUMMARY

Disclosed is an indium tin oxide nanotube or hollow indium tin oxide nanowire. Also disclosed is a method for manufacturing the indium tin oxide nanotubes.

In one aspect, the disclosed method for manufacturing indium tin oxide nanowire may include the steps of (1) preparing an electrospinning solution comprising a polymer component and an indium tin oxide precursor component, (2) electrospinning fibers using the electrospinning solution and (3) heating the fibers to a calcination temperature, wherein the heating step occurs at a heat rate greater than 15° C. per minute.

In another aspect, the disclosed method for manufacturing hollow indium tin oxide nanowire may include the steps of (1) electrospinning fibers that include indium tin oxide or precursors thereof, (2) drying the fibers and (3) heating the fibers to a calcination temperature at a heat rate of at least 20° C. per minute.

In another aspect, the disclosed method for manufacturing hollow indium tin oxide nanowire may include the steps of (1) electrospinning fibers that include indium tin oxide or precursors thereof, wherein the fibers are exposed to infrared radiation during the electrospinning step, (2) drying the fibers and (3) heating the fibers to a calcination temperature at a heat rate of at least 20° C. per minute.

In another aspect, the disclosed method for manufacturing hollow indium tin oxide nanowire may include the steps of (1) electrospinning fibers that include indium tin oxide or precursors thereof in an atmosphere having a relative humidity ranging from 15 to 60 percent, wherein the fibers are exposed to infrared radiation during the electrospinning step, (2) drying the fibers and (3) heating the dried fibers to a calcination temperature ranging from about 700° C. to about 1000° C. at a heat rate of at least 20° C. per minute.

In yet another aspect, the disclosed method for manufacturing hollow indium tin oxide nanowire may include the steps of (1) electrospinning fibers that include indium tin oxide or precursors thereof in an atmosphere having a relative humidity ranging from 15 to 60 percent, wherein the fibers are exposed to infrared radiation during the electrospinning step, (2) drying the fibers and (3) heating the dried fibers to about 800° C. at a heat rate of at least 20° C. per minute, wherein the fibers are maintained at 800° C. for at least 24 hours.

Other aspects of the disclosed hollow indium tin oxide nanowire and method of manufacture will become apparent from the following description, the accompanying drawings and the appended claims.

BRIEF DESCRIPTION OF THE DRAWINGS

FIG. 3 is a scanning electron micrograph image of composite fibers comprising a polymer and indium tin oxide precursors prepared during the electrospinning step of FIG. 1

FIGS. 4A(1) and 4A(2) are scanning electron micrograph images of hollow indium tin oxide nanowires manufactured without infrared assistance during the electrospinning step;

FIGS. 4B(1) and 4B(2) are scanning electron micrograph images of hollow indium tin oxide nanowires manufactured with infrared assistance during the electrospinning step.

DETAILED DESCRIPTION

It has now been discovered that indium tin oxide may be prepared as nanotubes or hollow nanowires. The hollow indium tin oxide nanowires have the desirable properties of solid indium tin oxide nanowires, such as optical transparency. Furthermore, the hollow indium tin oxide nanowires have the desirable properties of carbon nanotubes, such as high electrical conductivity, thermal stability and the ability to receive other materials within the hollow core, but with the advantageous optical transparency of indium tin oxide.

Figure 1:
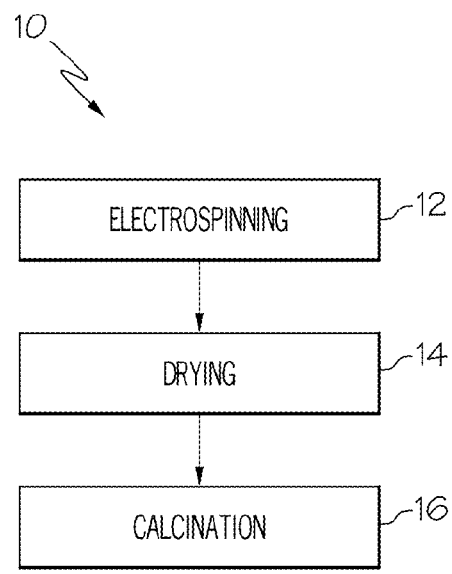
FIG. 1 is flow chart illustrating one aspect of the disclosed method for manufacturing hollow indium tin oxide nanowires.

The disclosed hollow indium tin oxide nanowire may be prepared using the manufacturing method 10 shown in FIG. 1. The method 10 may include an electrospinning step 12, a drying step 14 and a calcination step 16. Those skilled in the art will appreciate that method 10 may include additional steps without departing from the scope of the present disclosure.

The electrospinning step 12 of the disclosed method may result in the formation of polymer-based indium tin oxide precursor fibers. The resulting fibers may be nanofibers having a cross-sectional thickness ranging, for example, from about 1 to about 100 micrometers. The skilled artisan will appreciate that various apparatus and techniques may be employed to effect the electrospinning step 12 of the disclosed method 10.

Figure 2:
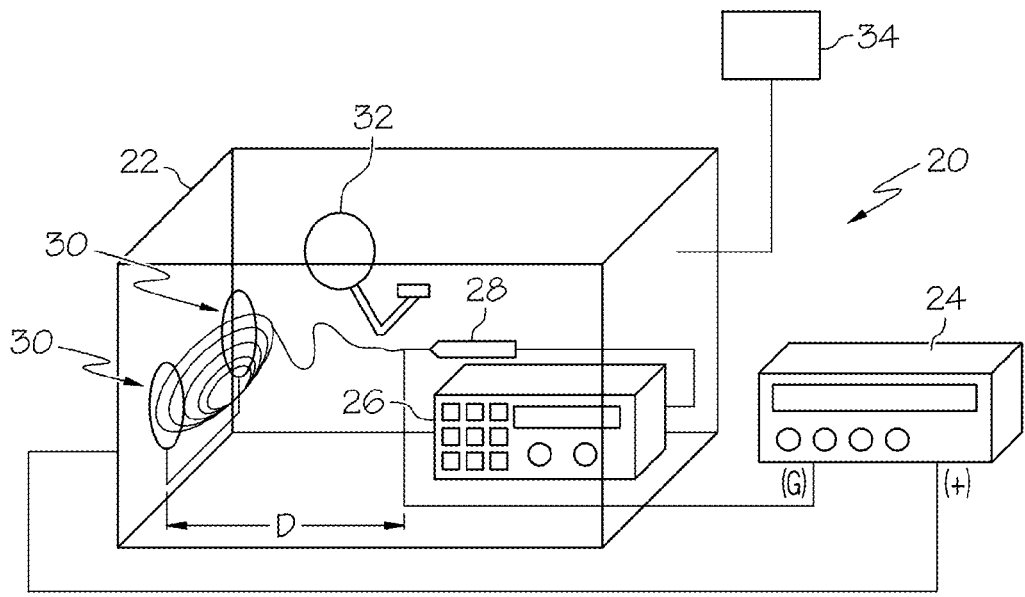
FIG. 2 is a schematic illustration of one implementation of an apparatus for performing the electrospinning step of FIG. 1.
Figure 5A:
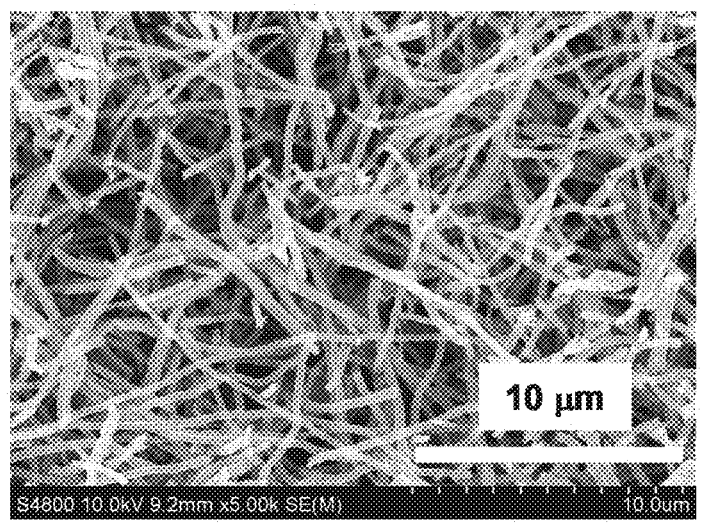
FIGS. 5A, 5B, 5C and 5D are scanning electron micrograph images of hollow indium tin oxide nanowires manufactured using the method of FIG. 1.
Figure 5B:
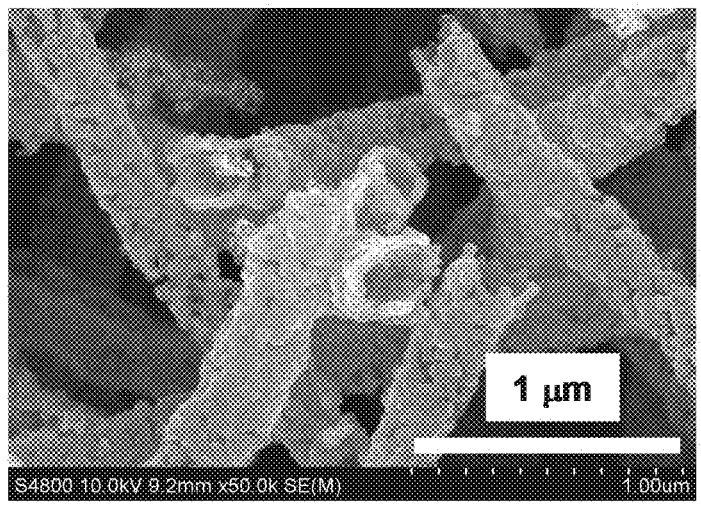
Figure 5C:
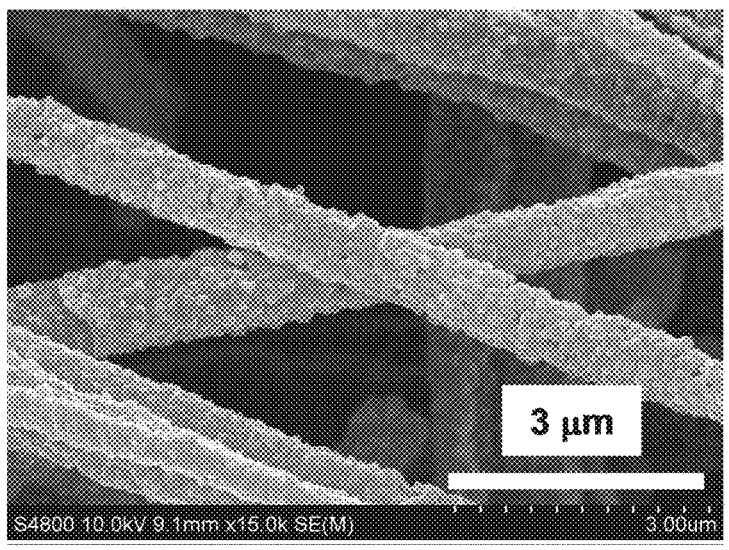
Figure 5D:
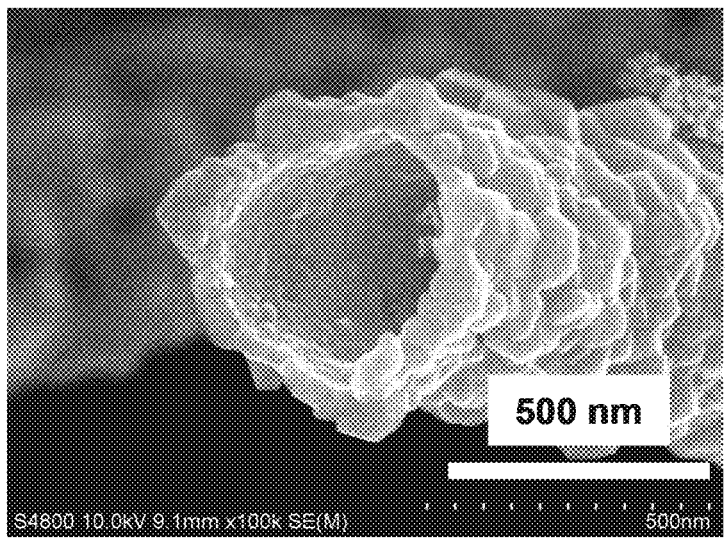

Referring to FIG. 2, one implementation of an apparatus for performing the electrospinning step 12 (FIG. 1) is shown and has been designated 20. The electrospinning apparatus 20 may include a chamber 22, a high voltage power source 24, a syringe pump 26 having a needle 28, one or more collectors 30 and an infrared source 32. The collectors 30 may be spaced from the needle 28 of the syringe pump 26 by a distance D, which, for example, may range from about 2 to about 20 centimeters.

As an example, the chamber 22 may be formed as a transparent box, the power source 24 may be a high-voltage direct-current unit, such as the Serial EL available from Glassman High Voltage, Inc., the syringe pump 26 may be the Geneie Plus available from Kent Scientific, the needle 28 may be a 27 gauge, 1¼ inch metallic needle associated with a 10-ml syringe available from BD Medical-Becton, Dickinson, and Company, the collectors 30 may be aluminum (e.g., aluminum foil) collectors, and the infrared source 32 may be a 250 W infrared lamp (operating at 115 to 125 V). The infrared source 32 may be positioned in the chamber 22 or external of the chamber 22 and may direct infrared radiation through the walls of the chamber 22.

A gas flow system 34 may be provided for controlling the humidity within the chamber 22. For example, the gas flow system 34 may bubble an inert gas (e.g., nitrogen) through water and may pass the humidified gas through the chamber 22. For example, the gas flow system 34 may pass the humidified gas through the chamber 22 at a flow rate of about 0 to about 20 milliliters per minute to achieve a desired relative humidity within the chamber 22. In one particular expression, the relative humidity within the chamber 22 may range from about 15 to about 60 percent.

The positive terminal of the power source 24 may be electrically coupled to the collectors 30 and the negative terminal of the power source 24 may be electrically coupled to the needle 28 of the syringe pump 26. During electrospinning, the voltage applied by the power source 24 may range from about 5 kV to about 15 kV. The skilled artisan will appreciate that the variation of voltage may generate fibers with different morphologies, including diameter and length.

In one specific example, the power source 24 may apply of a voltage of 15 kV for all substrates, flow rates, collection distances D) and solution formulations in an effort to hold a consistent, steady-state fabrication regime for a wide range of parameters at well below the voltage source limit.

During the electrospinning step 12 (FIG. 1), the chamber 22 may be sealed, the gas flow system 34 may be initiated to control the humidity in the chamber 22, the infrared source 32 may be activated to emit infrared radiation into the chamber 22, the power source 24 may be actuated to apply the desired voltage across the collectors 30 and the needle 28, and the syringe pump 26 may be actuated to supply an electrospinning solution to the needle 28. The electrospinning solution may be fed to the needle 28 at a rate ranging from, for example, about 0.001 to about 0.05 milliliters per minute.

The electrospinning solution may be any solution capable of forming fibers that include indium tin oxide or precursors of indium tin oxide. In one implementation, the electrospinning solution may include a polymer component and an indium tin oxide precursor component. The polymer component of the electrospinning solution may include a polymer, such as poly(vinylpyrrolidone), poly(vinyl alcohol), poly(aniline) or poly(ethylene oxide), and, optionally, a carrier, such as ethanol. The indium tin oxide precursor component of the electrospinning solution may include an indium component, such as $In(NO_3)_3$, and a tin component, such as $SnCl_4$, and, optionally, a carrier, such as water.

As an example, an electrospinning solution may be prepared as a sol-gel by vigorously stirring a solution having the formulation provided in Table 1:

TABLE 1

| Component | Percent of Formulation (by weight) |
|---|---|
| Poly(vinylpyrrolidone) | 10.5 |
| Ethanol | 67.7 |
| $In(NO_3)_3 \cdot xH_2O$ | 6.8 |
| $SnCl_4 \cdot 5H2O$ | 0.7 |
| Water | 14.3 |

After a homogenous sol-gel has been obtained, the electrospinning solution may be kept sealed to avoid evaporation of ethanol or water, which may results in the changes of viscosity of the solution. The changes of the viscosity of the sol-gel may directly impact on the quality of the formation of the fibers.

Thus, the electrospinning step 12 of the disclosed method 10 may result in the formation of fibers, shown in FIG. 3, that include indium tin oxide and/or precursors of indium tin oxide. Furthermore, when the electrospinning apparatus 20 of FIG. 2 has been used, the resulting fibers are formed at a controlled humidity level and are exposed to infrared radiation during formation.

As shown in FIGS. 4A(1), 4A(2), 4B(1) and 4B(2), infrared irradiation during the electrospinning step 12 (FIG. 1) is believed to result in the formation of indium tin oxide nanowires (FIGS. 4B(1) and 4B(2)) that are advantageously straighter and that advantageously include less cross knots when compared to indium tin oxide nanowires (FIGS. 4A(1) and 4A(2)) formed without infrared irradiation. However, it should be understood that the infrared radiation is not required for the formation of the disclosed indium tin oxide nanotubes/nanowires.

Referring back to FIG. 1, the electrospun fibers are dried at step 14. For example, the fibers collected during the electrospinning step 12 may be placed in an oven maintained at about 120° C. and dried, in air, for about 2 hours.

Once the electrospun fibers are dry or nearly dry (e.g., moisture content less than 20 percent by weight), the method 10 may proceed to the calcination step 16. During the calcination step 16, the dry, electrospun fibers may be heated (e.g., in an oven in ambient atmosphere) to a calcination temperature and maintained at the calcination temperature for a sufficient time to remove the polymer from the fibers and effect the formation of indium tin oxide. For example, the calcination temperature may range from about 700° C. to about 1000° C. As a specific example, the calcination temperature may be about 800° C. For example, the calcination time may range from about 2 hours to about 1 or more weeks. As a specific example, the calcination time may be at least about 24 hours.

Without being limited to any particular theory, it is believed that the dried, electrospun fibers may be rendered hollow by rapidly heating the fibers to the calcination temperature. Specifically, it is believed that a heat rate of at least 15° C. per minute may be necessary to result in the formation of hollow indium tin oxide nanowires, as opposed to solid-core indium tin oxide nanowires.

As a specific example, electrospun fibers were prepared using the apparatus of FIG. 2 and the electrospinning solution formulation of Table 1. The electrospun fibers were heated to 120° C. at a heat rate of 5° C. per minute and allowed to dry at 120° C. for 2 hours. After drying, the temperature was increased to 800° C. at a heat rate of 20° C. per minute. The dried fibers were then maintained at 800° C. for 24 hours for calcination, resulting in the formation of hollow indium tin oxide nanowires or indium tin oxide nanotubes. The hollow indium tin oxide nanowires are shown in FIGS. 5A, 5B, 5C and 5D at various levels of magnification.

The disclosed hollow indium tin oxide nanowires may have an average cross-sectional thickness ranging from about 10 nanometers to about 1000 nanometers, such as about 100 nanometers to about 1000 nanometers or, more specifically, about 100 nanometers to about 600 nanometers. The average length of the disclosed hollow indium tin oxide nanowires may depend on various process parameters and may range from, for example, about 1 micron to about 100 microns, such as about 10 microns to about 50 microns.

At this point, those skilled in the art will appreciate that the disclosed hollow indium tin oxide nanowires may include various promoters, such as various metals. For example, one or more promoters may be incorporated into the physical structure of the nanowire or, alternatively, may be positioned in the hollow core of the nanowire. The promoters may modify the electronic, chemical, thermal and/or mechanical properties of the hollow indium tin oxide nanowires.

Although various aspects of the disclosed hollow indium tin oxide nanowire and method of manufacture have been shown and described, modifications may occur to those skilled in the art upon reading the specification. The present application includes such modifications and is limited only by the scope of the claims.

What is claimed is:

1. A hollow indium tin oxide nanowire comprising an exterior surface defined by a plurality of irregular, generally nodular protrusions irregularly positioned along the length thereof as shown in the hollow indium tin oxide nanotube in the foreground of the TEM image of FIG. 5D.

2. The hollow indium tin oxide nanowire of claim 1 wherein the rough exterior surface comprises an irregular, rough exterior surface.

3. The hollow indium tin oxide nanowire of claim 1 having a cross-sectional thickness ranging from 10 nanometers to 1000 nanometers.

4. The hollow indium tin oxide nanowire of claim 1 having a cross-sectional thickness ranging from 100 nanometers to 600 nanometers.

5. The hollow indium tin oxide nanowire of claim 1 further comprising a promoter.

6. The hollow indium tin oxide nanowire of claim 1 wherein the promoter is received in said hollow core.

7. A method for manufacturing hollow indium tin oxide nanowire according to claim 1 comprising the steps of:
preparing an electrospinning solution comprising a polymer component and an indium tin oxide precursor component;
electrospinning fibers using said electrospinning solution; and
heating said fibers to a calcination temperature, wherein said heating step occurs at a heat rate greater than 15° C. per minute.

8. The method of claim 7 wherein said polymer component comprises a carrier and at least one of poly(vinylpyrrolidone), poly(vinyl alcohol), poly(aniline) and poly(ethylene oxide).

9. The method of claim 7 wherein said indium tin oxide precursor component comprises $In(NO_3)_3$, $SnCl_4$ and a carrier.

10. The method of claim 7 wherein said polymer component comprises poly(vinylpyrrolidone) and ethanol, and wherein said indium tin oxide precursor component comprises $In(NO_3)_3$, $SnCl_4$ and water.

11. The method of claim 7 wherein said fibers are exposed to infrared radiation during said electrospinning step.

12. The method of claim 7 wherein said electrospinning step is performing in an atmosphere having a relative humidity ranging from about 15 to about 60 percent.

13. The method of claim 7 further comprising the step of drying said fibers prior to said heating step; and said drying step includes maintaining said fibers at a drying temperature for at least 2 hours, wherein said drying temperature is in a range from about 100° C. to about 150° C.

14. The method of claim 7 wherein said calcination temperature is in a range from about 700° C. to about 1000° C.

15. The method of claim 7 wherein said calcination temperature is about 800° C.

16. The method of claim 7 wherein said heat rate is at least 20° C. per minute.

17. The method of claim 7 further comprising the step of maintaining said fibers at said calcination temperature for a predetermined calcination time.

18. The hollow indium tin oxide nanowire of claim 1 having an average length of about 1 μm to about 100 μm.

19. The hollow indium tin oxide nanowire of claim 1 having an average length of about 10 μm to about 50 μm.

* * * * *